United States Patent
Kagei et al.

(10) Patent No.: US 9,525,173 B2
(45) Date of Patent: Dec. 20, 2016

(54) METHOD FOR MANUFACTURING OVER-LITHIATED LAYERED LITHIUM METAL COMPOSITE OXIDE

(71) Applicant: Mitsui Mining & Smelting Co., Ltd., Tokyo (JP)

(72) Inventors: Shinya Kagei, Takehara (JP); Tsukasa Takahashi, Takehara (JP); Kyohei Yamaguchi, Takehara (JP); Yoshimi Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/028,036

(22) PCT Filed: Oct. 9, 2014

(86) PCT No.: PCT/JP2014/077046
§ 371 (c)(1),
(2) Date: Apr. 8, 2016

(87) PCT Pub. No.: WO2015/053357
PCT Pub. Date: Apr. 16, 2015

(65) Prior Publication Data
US 2016/0254539 A1 Sep. 1, 2016

(30) Foreign Application Priority Data
Oct. 10, 2013 (JP) .................. 2013-213214

(51) Int. Cl.
| | | |
|---|---|---|
| H01M 4/50 | (2010.01) | |
| H01M 4/505 | (2010.01) | |
| H01M 4/525 | (2010.01) | |
| C01G 53/00 | (2006.01) | |
| H01M 10/0525 | (2010.01) | |

(52) U.S. Cl.
CPC ............ *H01M 4/505* (2013.01); *C01G 53/50* (2013.01); *H01M 4/525* (2013.01); *C01P 2002/72* (2013.01); *C01P 2002/76* (2013.01); *C01P 2004/03* (2013.01); *C01P 2004/51* (2013.01); *C01P 2004/61* (2013.01); *C01P 2006/11* (2013.01); *C01P 2006/12* (2013.01); *C01P 2006/14* (2013.01); *C01P 2006/16* (2013.01); *C01P 2006/40* (2013.01); *H01M 10/0525* (2013.01); *Y02E 60/122* (2013.01); *Y02P 70/54* (2015.11); *Y02T 10/7011* (2013.01)

(58) Field of Classification Search
CPC ......... H01M 4/525; H01M 4/50; H01M 4/505
See application file for complete search history.

(56) References Cited

U.S. PATENT DOCUMENTS

| | | |
|---|---|---|
| 6,183,718 B1 | 2/2001 | Barker et al. |
| 6,555,026 B1 | 4/2003 | Barker et al. |
| 9,130,212 B1 | 9/2015 | Kokado et al. |
| 9,406,928 B2 | 8/2016 | Kokado et al. |
| 2003/0082452 A1 | 5/2003 | Ueda et al. |
| 2007/0248883 A1 | 10/2007 | Oda et al. |
| 2009/0121179 A1 | 5/2009 | Shi |
| 2009/0258296 A1 | 10/2009 | Kawasato et al. |
| 2010/0151332 A1 | 6/2010 | Lopez et al. |
| 2011/0059367 A1 | 3/2011 | Morita et al. |
| 2014/0225031 A1* | 8/2014 | Yasuda ............... H01M 4/505 252/182.1 |

FOREIGN PATENT DOCUMENTS

| | | |
|---|---|---|
| CN | 1351767 A | 5/2002 |
| CN | 101070191 A | 11/2007 |
| CN | 101071857 A | 11/2007 |
| CN | 103155240 A | 6/2013 |
| JP | 200317052 A | 1/2003 |
| JP | 2003238165 A | 8/2003 |
| JP | 2007257985 A | 10/2007 |
| JP | 2011082133 A | 4/2011 |
| JP | 2012511809 A | 5/2012 |
| JP | 201356801 A | 3/2013 |
| WO | 2008155989 A1 | 12/2008 |
| WO | 2013047569 A1 | 4/2013 |

* cited by examiner

*Primary Examiner* — Peter F Godenschwager
(74) *Attorney, Agent, or Firm* — The Webb Law Firm

(57) ABSTRACT

A positive electrode material for a lithium-ion cell, comprising an over-lithiated layered lithium metal composite oxide that provides the positive electrode material for a lithium-ion cell. Also, a method for manufacturing an over-lithiated layered lithium metal composite oxide represented by the general formula $Li_{1+x}M_{1-x}O_2$, where x is 0.10 or more and 0.33 or less, and M includes Mn and at least one element selected from the group consisting of Ni, Co, Al, Mg, Ti, Fe and Nb, wherein the method includes a step of mixing a lithium metal composite oxide represented by the general formula $Li_{1+x}M_{1-x}O_2$, where x is −0.15 to 0.15, and M includes Mn and at least one element selected from the group consisting of Ni, Co, Al, Mg, Ti, Fe and Nb, with a lithium compound to obtain a mixture and calcining the mixture to obtain the over-lithiated layered lithium metal composite oxide.

7 Claims, 3 Drawing Sheets

METHOD FOR MANUFACTURING OVER-LITHIATED LAYERED LITHIUM METAL COMPOSITE OXIDE

CROSS-REFERENCE TO RELATED APPLICATIONS

This application is the United States national phase of International Application No. PCT/ JP2014/077046 filed Oct. 9, 2014, and claims priority Japanese Patent Application No. 2013-213214 filed Oct. 10, 2013, the disclosures of which are hereby incorporated in thir entirety by reference.

TECHNICAL FIELD

The present invention relates to a method for manufacturing an over-lithiated layered lithium metal composite oxide (referred to also as "OLO" or the like) capable of being used as a positive electrode active substance material of a lithium-ion cell.

BACKGROUND ART

Lithium-ion cells, since they have characteristics of high energy density, long life and the like, are used as power supplies for household appliances such as video cameras, and portable electronic devices such as laptop computers and cellular phones. Recently, the lithium-ion cells have been applied also to large-size cells mounted on electric vehicles (EVs), hybrid electric vehicles (HEVs) and the like.

Lithium-ion cells are secondary cells having a following structure. In the charge time, lithium slips as ions out of a positive electrode and migrates to a negative electrode and is intercalated therein; On the other hand, in the discharge time, lithium ions reversely return from the negative electrode to the positive electrode, and their high energy density is known to be due to potentials of their positive electrode materials.

As positive electrode active substances of lithium-ion cells, there are known, in addition to lithium manganese oxide ($LiMn_2O_4$) having a spinel structure, lithium metal composite oxides having a layer structure, such as $LiCoO_2$, $LiNiO_2$ and $LiMnO_2$. For example, $LiCoO_2$ has a layer structure in which a lithium atom layer and a cobalt atom layer are alternately stacked through an oxygen atom layer. It is large in charge and discharge capacity and excellent in diffusability of lithium ion intercalation and deintercalation. For that reason, many of lithium-ion cells commercially available at present are lithium metal composite oxides having a layer structure, such as $LiCoO_2$.

Lithium metal composite oxides having a layer structure, such as $LiCoO_2$ and $LiNiO_2$, are represented by the general formula: $LiMeO_2$ (Me: transition metal). The crystal structure of these lithium metal composite oxides having a layer structure is assigned to a space group R-3m ("-" is usually attached on the upper part of "3," indicating rotatory inversion. The same applies hereinafter); and their Li ions, Me ions and oxide ions occupy the 3a site, the 3b site and the 6c site, respectively. Then, these lithium metal composite oxides are known to assume a layer structure in which a layer (Li layer) composed of Li ions and a layer (Me layer) composed of Me ions are alternately stacked through an O layer composed of oxide ions.

As the lithium metal composite oxide having such a layer structure, although $LiCoO_2$ is the mainstream at present, since Co is expensive, there has recently been paid attention to over-lithiated layered lithium metal composite oxides (referred to also as "OLO" or the like) in which Li is excessively added and the content of Co is reduced.

"$xLi_2MnO_3$-(1−x)$LiMO_2$ solid solution (M: Co, Ni or the like)" known as an over-lithiated layered lithium metal composite oxide is a solid solution of a $LiMO_2$ structure and a $Li_2MnO_3$ structure. The $Li_2MnO_3$ has a high capacity but is electrochemically inactive. By contrast, the $LiMO_2$ is electrochemically active but has a low theoretical capacity. It is then reported that when an "$xLi_2MnO_3$-(1−x)$LiMO_2$ solid solution (M: Co, Ni or the like)" is fabricated with the aim that by making the both into a solid solution, the electrochemically highly active property of the $LiMO_2$ is utilized while the high capacity of the $Li_2MnO_3$ is brought out, a high capacity can thereby actually be obtained. It is specifically known that when the solid solution is charged at 4.5 V or higher, whereas the effective capacity of the $LiCoO_2$ is 160 mAh/g, the effective capacity of the solid solution is improved up to about 200 to 300 mAh/g.

With respect to this kind of an over-lithiated layered lithium metal composite oxide, Patent Literature 1 discloses a positive electrode active substance composed of crystal particles of an oxide containing three transition metals and represented by $Li[Li_x(A_PB_QC_R)_{1-x}]O_2$ (wherein A, B and C are each a different transition metal element; and −0.1≤x≤0.3, 0.2≤P≤0.4, 0.2≤Q≤0.4, and 0.2≤R≤0.4) wherein the crystal structure of the crystal particles is a layer structure, and the arrangement of oxygen atoms constituting the oxide is cubic closest packing. There is also disclosed a production method thereof in which when a oxide is coprecipitated, dissolved oxygen is removed from an aqueous solution by bubbling an inert gas such as nitrogen or argon in the aqueous solution, or a reducing agent is previously added to the aqueous solution and the oxide obtained by the coprecipitation and lithium hydroxide are dry mixed, heated at a stretch up to 1,000° C., calcined at the temperature for 10 hours, and when being cooled after the calcination is finished, once annealed at 700° C. for 5 hours, and then slowly cooled.

Further, Patent Literature 2 relates to a powder of a lithium metal composite oxide represented by $Li_zNi_{1-w}M_wO_2$ (wherein M is at least one or more metal elements selected from the group consisting of Co, Al, Mg, Mn, Ti, Fe, Cu, Zn and Ga; and the followings are satisfied: 0<w≤0.25, and 1.0≤z≤1.1), and discloses a positive electrode active substance for a nonaqueous electrolyte secondary battery wherein the powder is constituted of secondary particles formed by aggregation of a plurality of the primary particles of the powder of the lithium metal composite oxide; the shape of the secondary particles is spherical or ellipsoidal; 95% or more of the secondary particles have a particle diameter of 20 μm or smaller, and the average particle diameter of the secondary particles is 7 to 13 μm; the tap density of the powder is 2.2 g/cm³ or higher; the average volume of pores having an average diameter of 40 nm or smaller in a pore distribution measurement using a nitrogen adsorption method is 0.001 to 0.008 cm³/g; and the average crushing strength of the secondary particles is 15 to 100 MPa. A production method of the positive electrode active substance for a nonaqueous electrolyte secondary battery is also disclosed, the method comprising: a step 1 of fabricating a metal composite hydroxide containing Ni and metal M (wherein M is at least one or more metal elements selected from the group consisting of Co, Al, Mg, Mn, Ti, Fe, Cu, Zn and Ga) and having a tap density of 1.7 g/cm³ or higher; a step 2 of weighing and mixing the metal composite hydroxide obtained in the step 1 and lithium hydroxide so that the ratio of the number of Li atoms to the total number of Ni atoms and metal M atoms becomes 1.0 to 1.1 to thereby obtain a mixture; and a step 3 of heating the mixture at a temperature-rise rate of 0.5 to 15° C./min from room temperature up to 450 to 550° C. and holding the mixture at the reached temperature for 1 to 10 hours to thereby carry out a first-stage calcination, thereafter further heating the resultant at a temperature-rise rate of 1 to 5° C./min up to 650 to 800° C., holding the resultant at the reached temperature for 0.6 to 30 hours to thereby carry out a second-stage calcination, and thereafter furnace-cooling the resultant to thereby obtain the positive electrode active substance for a nonaqueous electrolyte secondary battery.

Patent Literature 3 discloses a lithium metal composite oxide represented by the formula $Li_{1+x}Ni_\alpha Mn_\beta Co_\gamma O_2$ (wherein x is in the range of about 0.05 to about 0.25; α is in the range of about 0.1 to about 0.4; β is in the range of about 0.4 and about 0.65; and γ is in the range of about 0.05 to about 0.3). A production method thereof is disclosed in which a metal salt of desired molar ratio is dissolved in an aqueous solvent such as purified water; then, the pH of the solution is regulated by adding $Na_2CO_3$ and/or ammonium hydroxide to thereby precipitate a metal carbonate salt having a desired amount of the metal element; the precipitated metal carbonate salt is separated from the solution, cleaned and dried to thereby form a powder; after the drying, the recovered metal carbonate salt powder and a Li raw material are mixed, subjected to a heat treatment at about 400° C. to 800° C., and further calcined at a temperature of about 700° C. to 1,200° C. to thereby obtain the lithium metal composite oxide.

CITATION LIST

Patent Literature

Patent Literature 1: Japanese Patent Laid-Open No. 2003-17052
Patent Literature 2: Japanese Patent Laid-Open No. 2007-257985
Patent Literature 3: National Publication of International Patent Application No. 2012-511809

SUMMARY OF INVENTION

In the $xLi_2MnO_3$-$(1-x)LiMO_2$ solid solution (M: Co, Ni or the like) known as a representative example of over-lithiated layered lithium metal composite oxides (OLOs), whereas the charge and discharge capacity per mass can be improved as described above, the crystal is difficult to sufficiently grow; therefore, since the primary particle diameter cannot be made sufficiently large, the solid solution has the problem that the volumetric energy density as an electrode cannot be sufficiently enhanced.

Then, the present invention relates to an over-lithiated layered lithium metal composite oxide, and is to propose a production method of a novel over-lithiated layered lithium metal composite oxide whose primary particle diameter can be made large and whose volumetric energy density as an electrode can be enhanced.

The present invention proposes a method for manufacturing an over-lithiated layered lithium metal composite oxide represented by the general formula $Li_{1+x}M_{1-x}O_2$ (x is 0.10 or more and 0.33 or less; and M always contains Mn, and contains at least one or more elements selected from the group consisting of Ni, Co, Al, Mg, Ti, Fe and Nb), the method comprising a step of mixing and calcining a lithium metal composite oxide represented by the general formula $Li_{1+x}M_{1-x}O_2$ (x is −0.15 to 0.15; and M always contains Mn, and contains at least one or more elements selected from the group consisting of Ni, Co, Al, Mg, Ti, Fe and Nb) with a lithium compound to thereby obtain the over-lithiated layered lithium metal composite oxide.

The present invention also proposes, as an example of the above production method, a method for manufacturing an over-lithiated layered lithium metal composite oxide, the method comprising: a first step of calcining a raw material composition containing raw materials of a "Li element" and "M elements" in the general formula $Li_{1+x}M_{1-x}O_2$ (x is −0.15 or more and 0.15 or less; and M always contains Mn, and contains at least one or more elements selected from the group consisting of Ni, Co, Al, Mg, Ti, Fe and Nb) to thereby obtain a lithium metal composite oxide represented by the general formula $Li_{1+x}M_{1-x}O_2$ (x is −0.15 or more and 0.15 or less; and M always contains Mn, and contains at least one or more elements selected from the group consisting of Ni, Co, Al, Mg, Ti, Fe and Nb); and a second step of mixing and calcining the lithium metal composite oxide obtained in the first step with a lithium compound to thereby obtain the over-lithiated layered lithium metal composite oxide.

As described above, in over-lithiated layered lithium metal composite oxides (OLO), particularly over-lithiated layered lithium metal composite oxides represented by the general formula $Li_{1+x}M_{1-x}O_2$ (x is 0.10 or more and 0.33 or less; and M always contains Mn, and contains at least one or more elements selected from the group consisting of Ni, Co, Al, Mg, Ti, Fe and Nb), their crystal was difficult to grow and the primary particle diameter was difficult to make large; therefore, the oxides had the problem that the volumetric energy density as an electrode was difficult to enhance.

It was then aimed to fabricate an over-lithiated layered lithium metal composite oxide in which the range of x in $Li_{1+x}M_{1-x}O_2$ was 0.10 or higher by first producing a lithium metal composite oxide in which the range of x in $Li_{1+x}M_{1-x}O_2$ was near 0.0 (−0.15 to +0.15) to thereby largely grow the primary particle diameter, and then adding a lithium compound to the lithium metal composite oxide and calcining the resultant. This has enabled good characteristics of the over-lithiated layered lithium metal composite oxide (OLO), for example, increasing of the charge and discharge capacity per mass, to be maintained, the primary particle to be simultaneously made large, and the volumetric energy density as an electrode to be enhanced.

Hence, according to the production method which the present invention proposes, a positive electrode material for a lithium-ion cell especially excellent as a positive electrode active substance of, especially, vehicular cells, especially ones mounted on electric vehicles (EVs) and hybrid electric vehicles (HEVs) can be fabricated.

DESCRIPTION OF THE INVENTION

Figure 1:
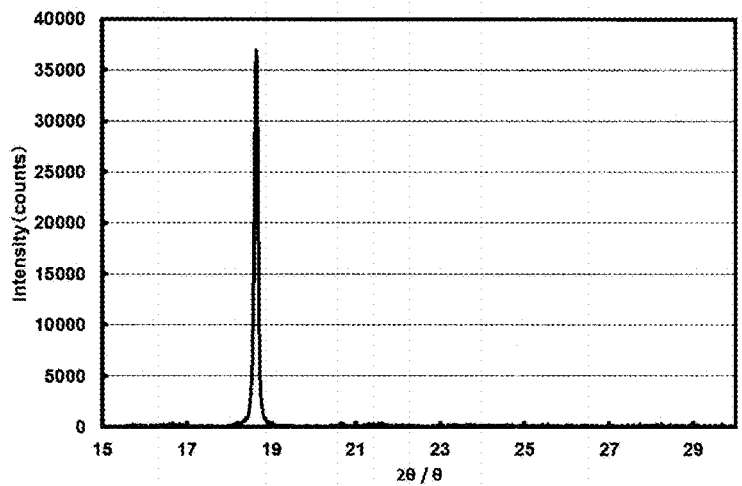
FIG. 1 is an XRD pattern of a lithium manganese nickel containing oxide powder (sample) obtained in Example 1.
Figure 2:
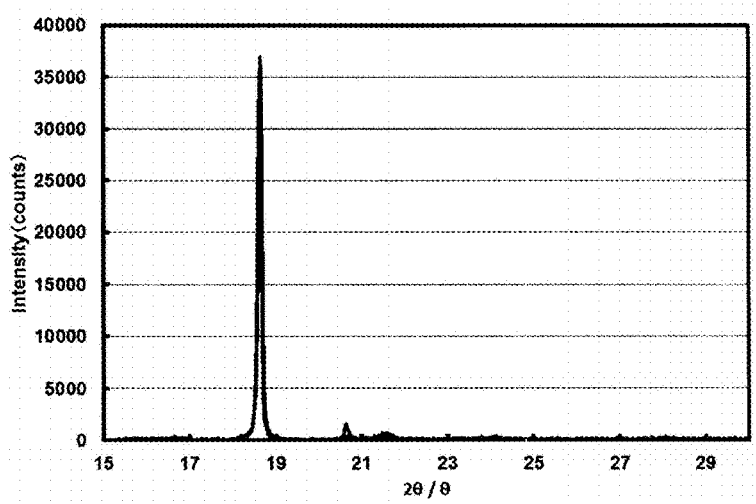
FIG. 2 is an XRD pattern of a lithium manganese nickel-containing oxide powder (sample) obtained in Comparative Example 1.
Figure 3:
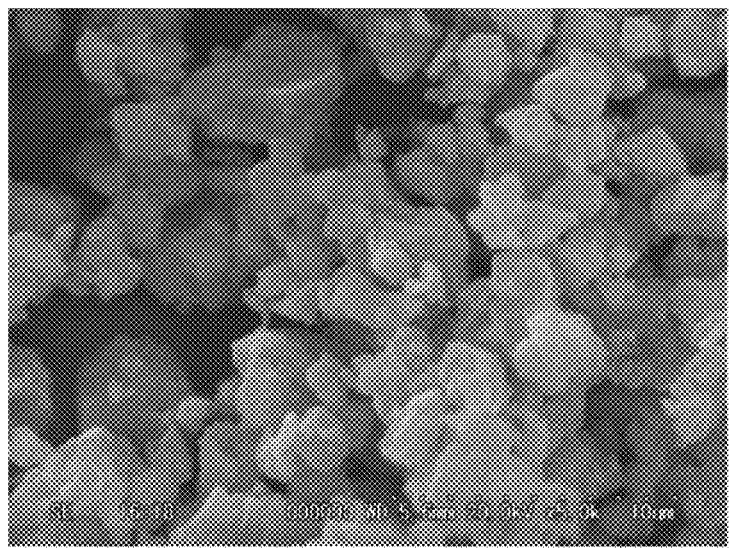
FIG. 3 is a SEM image of the lithium manganese nickel-containing oxide powder (sample) obtained in Example 1.
Figure 4:
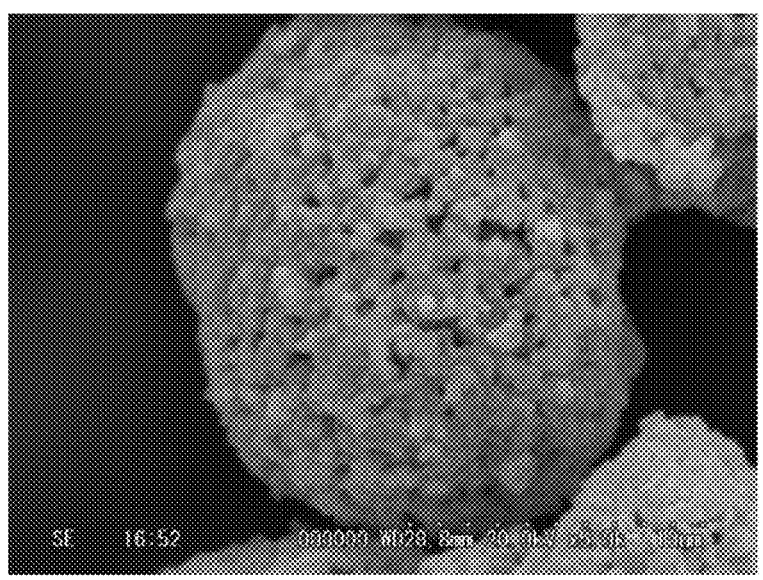
FIG. 4 is a SEM image of the lithium manganese nickel-containing oxide powder (sample) obtained in Comparative Example 1.
Figure 5:
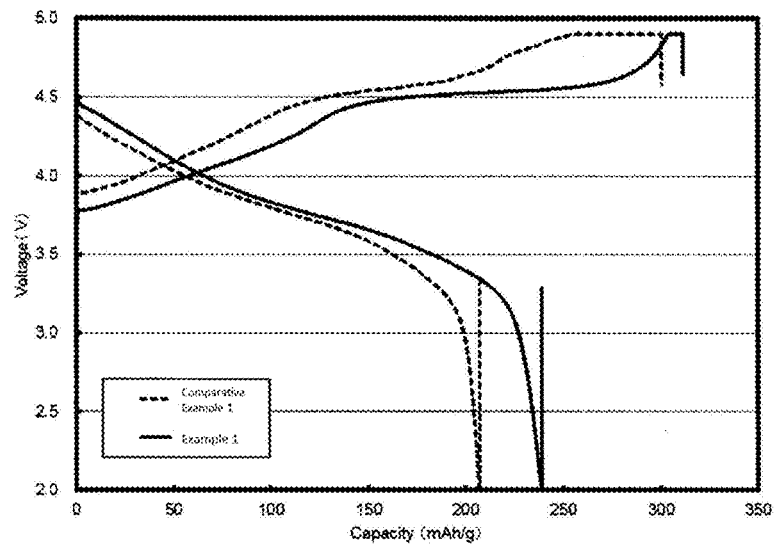
FIG. 5 is a graph showing charge and discharge curves of cells using the lithium manganese nickel-containing oxide powders (samples) obtained in Example 1 and Comparative Example 1.

Hereinafter, the embodiment according to the present invention will be described. However, the present invention is not limited to the following embodiment.

A method for manufacturing an over-lithiated layered lithium metal composite oxide which the present invention proposes is, as described above, a production method comprising a step of mixing and calcining a predetermined lithium metal composite oxide (referred to as "lithium metal composite oxide A") with a lithium compound to thereby obtain the over-lithiated layered lithium metal composite oxide (referred to as "present over-lithiated layered lithium metal composite oxide").

At this time, the lithium metal composite oxide A may be fabricated in a series of steps of producing the present over-lithiated layered lithium metal composite oxide, or may be fabricated in another series of steps other than the series of steps of the present over-lithiated layered lithium metal composite oxide. Further a lithium metal composite oxide A fabricated by another person may be used. Among these, in the present embodiment, a fabrication method of the lithium metal composite oxide A in the series of steps of producing the present over-lithiated layered lithium metal composite oxide will be described.

<The Present Production Method>

The production method (referred to as "present production method") of an over-lithiated layered lithium metal composite oxide according to an example of the present embodiment is a production method comprising: <a first step> of calcining a raw material composition containing raw materials of the "Li element" and "M elements" in the general formula $Li_{1+x}M_{1-x}O_2$ (x is −0.15 or more and 0.15 or less; and M always contains Mn, and contains at least one or more elements selected from the group consisting of Ni, Co, Al, Mg, Ti, Fe and Nb) to thereby obtain a lithium metal composite oxide A; and <a second step> of mixing and calcining the lithium metal composite oxide A obtained in the first step with a lithium compound to thereby obtain the present over-lithiated layered lithium metal composite oxide.

At this time, the first step or the second step or both the steps may be carried out only once, or may be carried out twice or more.

By not directly producing an over-lithiated layered lithium metal composite oxide from raw materials in a series of steps, but, as by the present production method, fabricating a lithium metal composite oxide A represented by $Li_{1+x}M_{1-x}O_2$ (x is −0.15 or more and 0.15 or less) in a first step, and mixing and calcining the lithium metal composite oxide A with a lithium compound in a second step thereafter to thereby enable the present over-lithiated layered lithium metal composite oxide to be obtained, the crystal growth of the lithium metal composite oxide was promoted in the first step and the primary particle diameter of the finally obtained over-lithiated layered lithium metal composite oxide could be made large, thereby enabling the powder characteristics to be regulated, including, for example, raising the tap density. On the other hand, in the second step, the chemical composition and the crystal structure of the over-lithiated layered lithium metal composite oxide could be regulated and the charge and discharge efficiency, for example, in the case where the present over-lithiated layered lithium metal composite oxide was used as a positive electrode active substance material of a lithium-ion cell could thereby be raised.

<The Present Over-Lithiated Layered Lithium Metal Composite Oxide as a Product>

The over-lithiated layered lithium metal composite oxide produced in the present embodiment is a powder comprising a lithium metal composite oxide having a layer structure and being represented by the general formula $Li_{1+x}M_{1-x}O_2$ (x is 0.10 or more and 0.33 or less; and M always contains Mn, and contains at least one or more elements selected from the group consisting of Ni, Co, Al, Mg, Ti, Fe and Nb).

Here, the "lithium metal composite oxide having a layer structure" is a lithium metal composite oxide particle having a layer structure in which a lithium atom layer and a transition metal atom layer are alternately stacked through an oxygen atom layer.

The over-lithiated layered lithium metal composite oxide, in spite of being a "powder comprising a lithium metal composite oxide," may contain, as impurities, for example, 1.0% by weight or less of $SO_4$ and 0.5% by weight or less of each of other elements. This is because it can be considered that amounts thereof in such degrees scarcely affect the characteristics of the present over-lithiated layered lithium metal composite oxide.

"x" in the above general formula is 0.10 or more and 0.33 or less, particularly 0.11 or more and 0.30 or less, and more preferably 0.12 or more and 0.30 or less.

When "x" is 0.10 or more, for example, in the case where the present over-lithiated layered lithium metal composite oxide is used as a positive electrode active substance material of a lithium-ion cell, a preferable charge and discharge capacity can be obtained; and when being 0.33 or less, a preferable electrochemical activity can be obtained.

"M" in the above general formula suffices if always containing Mn, and containing at least one or more elements selected from the group consisting of Ni, Co, Al, Mg, Ti, Fe and Nb. M can be exemplified by combinations including Mn—Ni, Mn—Co, Mn—Al, Mn—Mg, Mn—Ti, Mn—Fe, Mn—Nb, Mn—Ni—Co, Mn—Ni—Al, Mn—Ni—Mg, Mn—Ni—Ti, Mn—Ni—Fe, Mn—Ni—Nb, Mn—Ni—Co—Al, Mn—Ni—Co—Mg, Mn—Ni—Co—Ti, Mn—Ni—Co—Fe, and Mn—Ni—Co—Nb. However, "M" is not limited thereto, and may be a combination of the above combination, for example, further with one or two or more of Al, Mg, Ti, Fe and Nb.

Particularly the Mn content in the M elements is 20 to 90% by mass, particularly 40% by mass or more and 90% by mass or less, and preferably 50% by mass or more and 80% by mass or less.

Further the Ni content in the M elements is 0 to 80% by mass, particularly 20% by mass or more and 70% by mass or less, and preferably 20% by mass or more and 50% by mass or less.

Further the Co content in the M elements is 0 to 80% by mass, particularly 20% by mass or more and 70% by mass or less, and preferably 20% by mass or more and 50% by mass or less.

Here, in the above general formula, the atomic ratio of the amount of oxygen is described as "2" for convenience, but may be more or less unfixed.

<First Step>

The first step can be carried out by weighing and mixing raw materials containing a "Li element" and "M elements" in the lithium metal composite oxide represented by the general formula $Li_{1+x}M_{1-x}O_2$, such as a lithium raw material, a manganese raw material, a nickel raw material and a cobalt raw material, as required, crushing the mixture, as required, granulating the resultant, calcining the resultant, as required, subjecting the resultant to a heat treatment, as required, crushing the resultant, and further as required, classifying the resultant to thereby obtain a lithium metal composite oxide A.

(Raw Materials)

Examples of lithium raw materials include lithium hydroxide (LiOH), lithium carbonate ($Li_2CO_3$), lithium nitrate ($LiNO_3$), $LiOH.H_2O$, lithium oxide ($Li_2O$), and besides, lithium fatty acid lithium and lithium halides. Among these, hydroxide salts, carbonate salts and nitrate salts of lithium are preferable.

Manganese raw materials are not especially limited. For example, manganese carbonate, manganese nitrate, manganese chloride and manganese dioxide can be used, and among these, manganese carbonate and manganese dioxide are preferable. Among these, electrolytic manganese dioxide obtained by an electrolysis method is especially preferable.

Nickel raw materials are not especially limited. For example, nickel carbonate, nickel nitrate, nickel chloride, nickel oxyhydroxide, nickel hydroxide and nickel oxide can be used, and among these, nickel carbonate, nickel hydroxide and nickel oxide are preferable.

Cobalt raw materials are not especially limited. For example, basic cobalt carbonate, cobalt nitrate, cobalt chloride, cobalt oxyhydroxide, cobalt hydroxide and cobalt oxide can be used, and among these, basic cobalt carbonate, cobalt hydroxide, cobalt oxide and cobalt oxyhydroxide are preferable.

As raw materials of other M elements, that is, raw materials of Al, Mg, Ti, Fe and Nb, oxides, hydroxides, carbonates and the like of these elements can be used.

Further a boron compound may be blended in raw materials. Blending a boron compound can promote the calcination.

The boron compound may be a compound containing boron (B element), and for example, boric acid or lithium borate is preferably used. As lithium borate, various forms thereof, for example, lithium metaborate ($LiBO_2$), lithium tetraborate ($Li_2B_4O_7$), lithium pentaborate ($LiB_5O_8$) and lithium perborate ($Li_2B_2O_5$) can be used.

(Mixing)

As a mixing method of raw materials, there is preferably employed a wet mixing method in which liquid media such as water and a dispersant are added to and mixed with the raw materials and made into a slurry. In the case of employing a spray drying method described later, the obtained slurry is preferably crushed by a wet crusher. However, the crushing may be dry crushing.

(Granulation)

A granulation method may be of a wet type or a dry type as long as the raw materials crushed in the previous step are not separated and are dispersed in granulated particles.

The granulation method may be an extruding granulation method, a tumbling granulation method, a fluidized granulation method, a mixing granulation method, a spray drying granulation method, a pressing granulation method, or a flake granulation method using a roll or the like. However, in the case of the wet granulation, sufficient drying before the calcination is needed.

The drying may be carried out by a well-known drying method such as a spray heat drying method, a hot air drying method, a vacuum drying method, or a freeze drying method, and among these, a spray heat drying method is preferable. The spray heat drying method is carried out preferably by using a heat spray dryer (spray drier) (in the present description, referred to as "spray drying method").

However, a granulated powder obtained by a coprecipitation method may be used. As the coprecipitation method, there can be exemplified a production method of a composite hydroxide containing different elements coexisting therein, in which the hydroxide is precipitated by regulating conditions such as pH after raw materials are dissolved in a solution.

(Calcination)

The calcination in the first step may be carried out in a calcining furnace in an air atmosphere, an oxygen gas atmosphere, an atmosphere whose oxygen partial pressure is regulated, a carbon dioxide gas atmosphere, or another atmosphere. The calcination is preferably carried out in an atmosphere whose oxygen concentration is 20% or higher among these atmospheres.

The calcining temperature is a temperature of higher than 800° C. and lower than 1,500° C. (the temperature is that in the case where a material to be calcined in the calcining furnace is brought into contact with a thermocouple), preferably 810° C. or higher and 1,300° C. or lower, and more preferably 820° C. or higher and 1,100° C. or lower.

The calcining time is preferably 0.5 hour to 300 hours for which the calcination is carried out by holding the temperature.

The kind of the calcining furnace is not especially limited. The calcination can be carried out, for example, by using a rotary kiln, a stationary furnace or another calcining furnace.

(Heat Treatment)

It is preferable in the case where the regulation of the crystal structure is needed that the heat treatment after the calcination is carried out.

The heat treatment may be carried out under the condition of an oxidative atmosphere such as an air atmosphere, an oxygen gas atmosphere, and an atmosphere whose oxygen partial pressure is regulated.

Further such a heat treatment may be carried out by heating after cooling down to room temperature after the calcination, or may be carried out, continuously after the calcination, by making the temperature-fall rate down to room temperature to be 1.5° C./min or lower.

(Crushing)

The crushing after the calcination or the heat treatment may be carried out as required.

As a crushing method at this time, it is preferable that means of not reducing the primary particle diameter is selected. The means specifically includes Orient Mill crushing and crushing using a mortar.

Further the crushing may be carried out by using a low-speed or medium-speed rotary crusher or the like. The crusher includes, for example, a rotary crusher having a rotation frequency of about 1,000 rpm. When the crushing is carried out by a low-speed or medium-speed rotary crusher, aggregation of particles and weakly sintered portions can be cracked, and moreover, strains can be prevented from being generated in particles.

However, crushing methods are not limited to the above crushing methods.

The classification after the calcination, because of having a technical significance of regulation of the particle size distribution of an aggregated powder and removal of foreign matter, is preferably carried out by selecting a sieve having a preferable sieve opening.

(Lithium Metal Composite Oxide A)

The lithium metal composite oxide A fabricated in the first step suffices if being a lithium metal composite oxide represented by the general formula $Li_{1+x}M_{1-x}O_2$ (x is −0.15 or more and 0.15 or less; and M always contains Mn, and contains at least one or more elements selected from the group consisting of Ni, Co, Al, Mg, Ti, Fe and Nb), and is preferably the lithium metal composite oxide having a layer structure.

In the above general formula, x is preferably −0.15 or more and 0.15 or less, particularly −0.05 or more and 0.10 or less, and preferably 0.00 or more and 0.05 or less.

When in the above general formula, x is in the range of −0.15 or more and 0.15 or less, the primary particle diameter of the lithium metal composite oxide can be made sufficiently large, and further by adding a lithium compound to the lithium metal composite oxide A in this range, and calcining, an over-lithiated layered lithium metal composite oxide capable of materializing preferable cell characteristics can be produced.

(The Primary Particle Diameter and the Tap Density of the Lithium Metal Composite Oxide A)

The primary particle diameter of the lithium metal composite oxide A is preferably 0.7 μm or larger, particularly 0.8 μm or larger and 5.0 μm or smaller, and especially preferably 0.9 μm or larger and 3.0 μm or smaller.

When the primary particle diameter of the lithium metal composite oxide A is 0.7 μm or larger, the finally obtained primary particle diameter of the present over-lithiated layered lithium metal composite oxide can be made to be 1.0 μm or larger.

The regulation of the primary particle diameter of the lithium metal composite oxide A in the above range can be made by regulation of the compositional ratios of transition metals (for example, ratios of transition metal elements contained in M, and compositional ratios of Li:M and the like), the raw material particle sizes, the calcining conditions and the like. Particularly by raising the calcining temperature, the primary particle diameter can be made large.

The tap density of the lithium metal composite oxide A is preferably 1.3 $g/cm^3$ or higher, particularly 1.3 $g/cm^3$ or higher and 3.0 $g/cm^3$ or lower, and especially preferably 1.4 $g/cm^3$ or higher and 2.9 $g/cm^3$ or lower.

When the tap density of the lithium metal composite oxide A is 1.3 $g/cm^3$ or higher, the finally obtained tap density of the present over-lithiated layered lithium metal composite oxide can be made to be 1.9 $g/cm^3$ or higher.

The regulation of the tap density of the lithium metal composite oxide A in the above range can be made by regulation of the compositional ratios of transition metals (for example, ratios of transition metal elements contained in M, and compositional ratios of Li:M and the like), the raw material particle sizes, the calcining conditions and the like. Particularly by raising the calcining temperature, the tap density can be made high.

<Second Step>

The second step can be carried out by mixing and calcining the lithium metal composite oxide A obtained in the first step with a lithium compound, as required, subjecting the resultant to a heat treatment, as required, crushing the resultant, and further as required, classifying the resultant to thereby obtain the over-lithiated layered lithium metal composite oxide.

(Lithium Compound)

The lithium compound is not especially limited as long as being a compound containing lithium. Particularly lithium hydroxide or lithium carbonate is preferably used.

(Mixing)

A mixing method to be employed of the lithium metal composite oxide A with the lithium compound is preferably a method of not reducing the primary particle diameter of the lithium metal composite oxide A.

The mixing method specifically include, for example, use of a ball mill, an SC mill, a mixer and the like. However, mixing methods are not limited to these mixing methods.

(Calcination)

The calcination in the second step suffices if being carried out in an air atmosphere, an oxygen gas atmosphere, an atmosphere whose oxygen partial pressure is regulated, a carbon dioxide gas atmosphere, or another atmosphere. The calcination is preferably carried out in an atmosphere whose oxygen concentration is 20% or higher among these atmospheres.

The calcining temperature (highest reached temperature) of the second step is preferably higher than the calcining temperature (highest reached temperature) of the first step. The calcining temperature of the second step is preferably higher by 10° C. to 200° C. than the calcining temperature of the first step, more preferably higher by 20° C. or higher and 180° C. or lower, still more preferably by 30° C. or higher and 170° C. or lower, further still more preferably by 40° C. or higher and 150° C. or lower, and further still more preferably by 100° C. or lower.

Specifically, the calcining temperature of the second step (the temperature is that in the case where a material to be calcined in the calcining furnace is brought into contact with a thermocouple) is a temperature of 900 to 1,200° C., preferably 950° C. or higher and 1,200° C. or lower, and more preferably 1,000° C. or higher and 1,100° C. or lower.

The calcining time is preferably 0.5 hour to 300 hours for which the calcination is carried out by holding the temperature.

At this time, it is preferable to select calcining conditions where transition metals dissolve in the atomic level as a solid solution and exhibit a single phase.

The kind of a calcining furnace is not especially limited. The calcination can be carried out, for example, by using a rotary kiln, a stationary furnace or another calcining furnace.

(Heat Treatment)

It is preferable in the case where the regulation of the crystal structure is needed that the heat treatment after the calcination is carried out.

The heat treatment may be carried out under the condition of an oxidative atmosphere such as an air atmosphere, an oxygen gas atmosphere, and an atmosphere whose oxygen partial pressure is regulated.

Further such a heat treatment may be carried out in such a way that the object is cooled down to room temperature after the calcination, and thereafter heated, or that the object is cooled at a temperature-fall rate of 1.5° C. down to room temperature successively to the calcination.

(Crushing)

The crushing after the calcination or the heat treatment may be carried out as required.

As a crushing method at this time, it is preferable that means of not reducing the primary particle diameter is selected. The means specifically includes Orient Mill crushing and crushing using a mortar.

Further the crushing may be carried out by using a low-speed or medium-speed rotary crusher or the like. The crusher includes, for example, a rotary crusher having a rotation frequency of about 1,000 rpm. When the crushing is carried out by a low-speed or medium-speed rotary crusher, aggregation of particles and weakly sintered portions can be cracked, and moreover, strains can be prevented from being generated in particles.

However, crushing methods are not limited to the above crushing methods.

The classification after the calcination, because of having a technical significance of regulation of the particle size distribution of an aggregated powder and removal of foreign matter, is preferably carried out by selecting a sieve having a preferable sieve opening size.

<Primary Particle Diameter>

The primary particle diameter of the present over-lithiated layered lithium metal composite oxide can be made to be 1.0 µm or larger by the present production method. The primary particle diameter can be made to be particularly 1.1 µm or larger and 5.0 µm or smaller, and more particularly 1.2 µm or larger and 4.9 µm or smaller.

By making the primary particle diameter of the present over-lithiated layered lithium metal composite oxide to be 1.0 µm or larger, the volumetric energy density as an electrode can be enhanced sufficiently.

The primary particle diameter was determined by using a scanning electron microscope (SEM), randomly selecting a plurality of, for example, 10 particles from an acquired SEM image, measuring minor diameters of the primary particles, converting the measured lengths on the reduced scale, and determining an average value as the primary particle diameter.

The regulation of the primary particle diameter of the over-lithiated layered lithium metal composite oxide in the above range can be made by regulation of the compositional ratios of transition metals (for example, ratios of transition metal elements contained in M, and compositional ratios of Li:M and the like), the raw material particle sizes, the calcining conditions and the like. For example, by raising the calcining temperature, the primary particle diameter of the over-lithiated layered lithium metal composite oxide can be made large.

<Tap Density>

The tap density (referred to also as "T.D.") of the present over-lithiated layered lithium metal composite oxide can be made to be 1.9 g/cm$^3$ or higher, particularly 2.0 g/cm$^3$ or higher and 4.4 g/cm$^3$ or lower, and more particularly 2.1 g/cm$^3$ or higher and 4.3 g/cm$^3$ or lower.

When the tap density of the present over-lithiated layered lithium metal composite oxide is 1.9 g/cm$^3$ or higher, the volumetric energy density as an electrode can effectively be enhanced.

The tap density can be determined, for example, by using a shaking specific gravity meter, putting a sample in a glass measuring cylinder, tapping the measuring cylinder in a predetermined stroke for predetermined times, and measuring a powder packing density.

In order to provide such a tap density, the tap density can be raised due to the powder characteristics of the lithium metal composite oxide A obtained in the first step in the present production method. However, the tap density regulation method is not limited to such a method.

<Average Particle Diameter (D50)>

The average particle diameter (D50) of the present over-lithiated layered lithium metal composite oxide as determined by a laser diffraction scattering-type particle size distribution measuring method can be made to be 1 µm to 60 µm by the present production method, particularly 2 µm or larger and 59 µm or smaller, and more particularly 3 µm or larger and 58 µm or smaller.

The present over-lithiated layered lithium metal composite oxide, when having a D50 of 1 µm to 60 µm, is satisfactory from the viewpoint of electrode fabrication.

The regulation of the D50 of the present over-lithiated layered lithium metal composite oxide in the above range is preferably carried out by regulation of D50 of starting materials, regulation of the calcining temperature and the calcining time, and regulation of D50 by crushing after the calcination, in the present production method. However, regulating methods are not limited to these methods.

A particle made by aggregation of a plurality of the primary particles with parts of their outer peripheries (grain boundaries) being shared, with the particle being isolated from other particles, is referred to as a "secondary particle" or an "aggregated particle" in the present invention.

In this connection, the laser diffraction scattering-type particle size distribution measuring method is a measuring method of calculating a particle diameter by taking an aggregated powder particle as one particle (aggregated particle); and the average particle diameter (D50) means a 50% volume-cumulative particle diameter, that is, a diameter at a cumulation of 50% from the finer side in a cumulative percentage representation of particle diameter measurement values in terms of volume in a chart of a particle size distribution in terms of volume.

<Specific Surface Area (SSA)>

The specific surface area (SSA) of the present over-lithiated layered lithium metal composite oxide can be made to be 0.1 to 3.0 m$^2$/g, by the present production method, particularly 0.2 m$^2$/g or larger and 2.9 m$^2$/g or smaller, and more particularly 0.3 m$^2$/g or larger and 2.8 m$^2$/g or smaller.

The present over-lithiated layered lithium metal composite oxide, when having a specific surface area (SSA) of 0.1 to 3.0 m$^2$/g, is preferable from the viewpoint of the rate capability.

The regulation of the specific surface area (SSA) of the present over-lithiated layered lithium metal composite oxide in the above range may be carried out by regulation of the calcining conditions (temperature, time, atmosphere and the like), and the crushing power (rotation frequency of a crushing machine, and the like) after the calcination. However, regulation methods are not limited to this method.

(XRD Measurement)

In a diffraction pattern of the crystal structure X-ray diffraction (XRD) of the present over-lithiated layered lithium metal composite oxide, the intensity of the main peak in the range of $2\theta=20$ to $22°$ to that of the main peak in the range of $2\theta=16$ to $20°$ can be made to be lower than 4.0% by the present production method, preferably lower than 3.0%, and more preferably lower than 2.0%.

Here, the main peak in the range of $2\theta=20$ to $22°$ refers to a maximum-intensity peak among peaks present in the range of $2\theta=20$ to $22°$; and the main peak in the range of $2\theta=16$ to $20°$ refers to a maximum-intensity peak among peaks present in the range of $2\theta=16$ to $20°$.

In the present over-lithiated layered lithium metal composite oxide, since it is presumed that the main peak in the range of $2\theta=20$ to $22°$ is caused by the $Li_2MnO_3$ structure, that the intensity of such a peak is lower than 4.0% to that of the main peak in the range of $2\theta=16$ to $20°$, that is, to that of the peak caused by the layer structure presumably implies that the present positive electrode material has a single phase structure or a structure near it in which there is almost no $Li_2MnO_3$ structure.

Methods for producing the over-lithiated layered lithium metal composite oxide having such characteristics include, for example, a method in which a solid solution positive electrode is not directly produced, but as in the present production method, a lithium metal composite oxide A is fabricated in a first step and thereafter, the lithium metal composite oxide A and a lithium compound are mixed and calcined.

<Crystallite Size>

The crystallite size of the present over-lithiated layered lithium metal composite oxide, that is, the crystallite size determined by a measuring method (which will be described in detail in the Example paragraph) using a Rietveld method can be made to be 50 nm or larger, particularly 50 nm or larger and 300 nm or smaller, and more particularly 51 nm or larger and 290 nm or smaller.

Here, the "crystallite" means a largest aggregation which can be regarded as a single crystal, and can be determined by an XRD measurement and the Rietveld analysis.

A particle of a smallest unit constituted of a plurality of crystallites and surrounded by a grain boundary when being observed by SEM (for example, a magnification of 3,000 times) is referred to as a "primary particle" in the present invention. Therefore, the primary particle contains single crystals and polycrystals.

From such a viewpoint, when the crystallite size of the present over-lithiated layered lithium metal composite oxide is 50 nm or larger, the primary particle can be made larger and the volumetric energy density as an electrode can be enhanced much more.

The regulation of the crystallite size in the above range may be carried out by regulation of the compositional ratios of transition metals (for example, ratios of transition metal elements contained in M, and compositional ratios of Li:M and the like), the raw material particle sizes, the calcining conditions and the like. For example, by raising the calcining temperature, the crystallite size can be made large.

<Characteristics and Applications>

The present over-lithiated layered lithium metal composite oxide is, as required, cracked and classified, and thereafter as required, mixed with other positive electrode materials, and can effectively be utilized as a positive electrode active substance of a lithium cell.

A positive electrode mixture can be produced, for example, by mixing the present over-lithiated layered lithium metal composite oxide, a conductive material composed of carbon black and the like, and a binder composed of a Teflon (R) binder. Then, by using such a positive electrode mixture for a positive electrode, using, for example, lithium or a material capable of intercalating and deintercalating lithium, such as carbon, for a negative electrode, and using, for a nonaqueous electrolyte, a solution in which a lithium salt such as lithium hexafluorophosphate ($LiPF_6$) is dissolved in a mixed solvent of ethylene carbonate-dimethyl carbonate or the like, a lithium secondary cell can be constituted. However, cell constitutions are not limited to such a constitution.

Lithium cells which have the present over-lithiated layered lithium metal composite oxide as their positive electrode active substance are especially excellent for an application to a positive electrode active substance of lithium cells used as motor driving power supplies mounted especially on electric vehicles (EVs) and hybrid electric vehicles (HEVs).

Here, the "hybrid vehicles" are vehicles which concurrently use two power sources of an electric motor and an internal combustion engine, and include plug-in hybrid vehicles.

Further the "lithium cells" means including every cell containing lithium or lithium ions therein, such as lithium primary cells, lithium secondary cells, lithium ion secondary cells and lithium polymer cells.

<Explanation Of Terms>

In the present description, in the case of being expressed as "X to Y" (X and Y are arbitrary numbers), unless otherwise specified, the expression includes a meaning of "X or more and Y or less," and also a meaning of "preferably more than X" and "preferably less than Y."

Further in the case of being expressed as "X or more" (X is an arbitrary number" or "Y or less" (Y is an arbitrary number), the expression includes an intention to the effect of "preferably more than X" or "preferably less than Y."

EXAMPLES

Then, based on Examples and Comparative Examples, the present invention will be described further. The present invention, however, is not limited to the following Examples.

Comparative Example 1

Lithium carbonate, electrolytic manganese dioxide and nickel hydroxide were weighed so that the composition became $Li_{1.15}Ni_{0.58}Mn_{0.27}O_2$; and water was added thereto, and mixed and stirred to thereby prepare a slurry having a solid content concentration of 10% by weight.

A polycarboxylic acid ammonium salt (manufactured by San Nopco Ltd., SN Dispersant 5468) of 6% by weight of the slurry solid content as a dispersant was added to the obtained slurry (500 g as a raw material powder), and crushed by a wet crusher at 1,200 rpm for 20 min into an average particle diameter (D50) of 0.5 μm or smaller to thereby obtain a crushed slurry.

The obtained crushed slurry was granulated and dried by using a heat spray dryer (manufactured by Ohkawara Kakohki Co., Ltd., Spray Dryer "i-8"). At this time, the spraying used a rotary disk, and the granulation and drying was carried out at a rotation frequency of 24,000 rpm, at an amount of slurry to be fed of 12 kg/hr and by regulating the temperature so that the temperature of the outlet port of the drying tower became 100° C. The average particle diameter (D50) of the granulated powder was 15 μm.

The obtained granulated powder was heated by using a stationary electric furnace at a temperature-rise rate of 1.3° C./min up to 950° C., and maintained at 950° for 20 hours. Thereafter, the powder was cooled at a temperature-fall rate of 1.3° C./min down to 700° C., maintained at 700° for 10 hours, and thereafter cooled at a temperature-fall rate of 1.3° C./min down to room temperature. The obtained powder was cracked, and by again using the stationary electric furnace, heated at a temperature-rise rate of 1.3° C./min up to 950° C. in the air, maintained at 950° for 20 hours, and thereafter cooled at a temperature-fall rate of 1.3° C./min down to 700° C., maintained at 700° for 10 hours, and thereafter cooled at a temperature-fall rate of 1.5° C./min down to room temperature. Thereafter, the obtained powder was cracked and classified with a sieve having a sieve opening of 53 μm; and the undersize powder was recovered to thereby obtain a lithium manganese nickel-containing oxide powder (sample).

As a result of a chemical analysis of the obtained lithium manganese nickel-containing oxide powder (sample), it was confirmed that the sample powder was $Li_{1.17}Ni_{0.56}Mn_{0.27}O_2$.

Example 1

Lithium carbonate, electrolytic manganese dioxide and nickel hydroxide were weighed so that the composition became $Li_{1.06}Ni_{0.47}Mn_{0.47}O_2$; and water was added thereto, and mixed and stirred to thereby prepare a slurry having a solid content concentration of 10% by weight.

A polycarboxylic acid ammonium salt (manufactured by San Nopco Ltd., SN Dispersant 5468) of 6% by weight of the slurry solid content as a dispersant was added to the obtained slurry (500 g as a raw material powder), and crushed by a wet crusher at 1,200 rpm for 20 min into an average particle diameter (D50) of 0.5 μm or smaller to thereby obtain a crushed slurry.

The obtained crushed slurry was granulated and dried by using a heat spray dryer (manufactured by Ohkawara Kakohki Co., Ltd., Spray Dryer "i-8"). At this time, the spraying used a rotary disk, and the granulation and drying was carried out at a rotation frequency of 24,000 rpm, at an amount of slurry to be fed of 12 kg/hr and by regulating the temperature so that the temperature of the outlet port of the drying tower became 100° C. The average particle diameter (D50) of the granulated powder was 15 μm.

The obtained granulated powder was heated by using a stationary electric furnace at a temperature-rise rate of 1.5° C./min up to 700° C. in the air, and maintained at 700° for 20 hours. Thereafter, the powder was cooled at a temperature-fall rate of 1.5° C./min down to room temperature. Then, the powder, by again using the stationary electric furnace, was heated at a temperature-rise rate of 1.5° C./min up to 1,000 in the air, maintained at 1,000° for 30 hours, and thereafter cooled at a temperature-fall rate of 1.5° C./min down to room temperature. The calcined powder thus obtained was cracked and classified with a sieve having a sieve opening of 53 μm; and the undersize lithium metal composite oxide powder was recovered.

As a result of a chemical analysis of the recovered undersize lithium metal composite oxide powder, it was confirmed that the recovered powder was $Li_{1.06}Ni_{0.47}Mn_{0.47}O_2$.

Further the primary particle diameter of the undersize lithium metal composite oxide powder was 0.9 μm and the tap density thereof was 1.6 g/cm³.

Then, lithium carbonate was added to the recovered undersize lithium metal composite oxide powder so as to make a target composition $Li_{1.13}Mn_{0.45}Ni_{0.42}O_2$, and mixed by using a ball mill for 1 hour. The obtained mixed powder, by using a stationary electric furnace, was heated at a temperature-rise rate of 1.3° C./min up to 1,050° C. in the air, maintained at 1,050° for 20 hours, and thereafter cooled at a temperature-fall rate of 1.3° C./min down to room temperature. The calcined powder thus obtained was cracked and classified with a sieve having a sieve opening of 53 μm; and the undersize powder was recovered to thereby obtain a lithium manganese nickel-containing oxide powder (sample).

As a result of a chemical analysis of the obtained lithium manganese nickel-containing oxide powder (sample), it was confirmed that the sample powder was $Li_{1.13}Ni_{0.45}Mn_{0.42}O_2$.

Further the primary particle diameter of the obtained lithium manganese nickel-containing oxide powder (sample) was 1.2 μm, and the tap density thereof was 2.2 g/cm³.

Example 2

A lithium metal composite oxide powder was fabricated as in Example 1, and an undersize lithium metal composite oxide powder was similarly obtained. As a result of a chemical analysis of the obtained undersize lithium metal composite oxide powder, it was confirmed that the powder was $Li_{1.06}Ni_{0.47}Mn_{0.47}O_2$. The primary particle diameter of the obtained lithium metal composite oxide powder (sample) was 0.9 μm, and the tap density thereof was 1.6 g/cm³.

Then, a lithium manganese nickel-containing oxide powder (sample) was obtained as in Example 1, except for adding lithium carbonate to the undersize lithium metal composite oxide powder so as to make a target composition $Li_{1.14}Mn_{0.43}Ni_{0.43}O_2$.

As a result of a chemical analysis of the obtained lithium manganese nickel-containing oxide powder (sample), it was confirmed that the sample powder was $Li_{1.14}Mn_{0.43}Ni_{0.43}O_2$.

Further the primary particle diameter of the obtained lithium manganese nickel-containing oxide powder (sample) was 1.6 μm, and the tap density thereof was 2.5 g/cm³.

Example 3

An undersize lithium metal composite oxide powder was recovered as in Example 1, except for weighing and mixing lithium carbonate, electrolytic manganese dioxide, nickel hydroxide and cobalt oxyhydroxide so that the composition became $Li_{1.06}Mn_{0.47}Ni_{0.33}Co_{0.14}O_2$.

As a result of a chemical analysis of the recovered undersize lithium metal composite oxide powder, it was confirmed that the powder was $Li_{1.06}Mn_{0.47}Ni_{0.33}Co_{0.14}O_2$.

Further the primary particle diameter of the undersize lithium metal composite oxide powder was 0.8 μm, and the tap density thereof was 1.4 g/cm³.

Then, a lithium manganese nickel-containing oxide powder (sample) was obtained as in Example 1, except for adding lithium carbonate to the undersize lithium metal composite oxide powder so as to make a target composition $Li_{1.14}Mn_{0.43}Ni_{0.30}Co_{0.13}O_2$.

As a result of a chemical analysis of the obtained lithium manganese nickel-containing oxide powder (sample), it was confirmed that the sample powder was $Li_{1.14}Mn_{0.43}Ni_{0.30}Co_{0.13}O_2$.

Further the primary particle diameter of the obtained lithium manganese nickel-containing oxide powder (sample) was 1.5 μm, and the tap density thereof was 2.2 g/cm³.

Example 4

An undersize lithium metal composite oxide powder was recovered as in Example 1, except for weighing and mixing lithium carbonate, electrolytic manganese dioxide, cobalt oxyhydroxide, aluminum hydroxide and nickel hydroxide so that the composition became $Li_{1.06}Mn_{0.37}Ni_{0.33}Co_{0.14}Al_{0.10}O_2$.

As a result of a chemical analysis of the recovered undersize lithium metal composite oxide powder, it was confirmed that the powder was $Li_{1.06}Mn_{0.37}Ni_{0.33}Co_{0.14}Al_{0.10}O_2$.

Further the primary particle diameter of the undersize lithium metal composite oxide powder was 1.1 μm, and the tap density thereof was 2.0 g/cm³.

Then, a lithium manganese nickel-containing oxide powder (sample) was obtained as in Example 1, except for adding lithium carbonate to the undersize lithium metal composite oxide powder so as to make a target composition $Li_{1.14}Mn_{0.34}Ni_{0.30}Co_{0.13}Al_{0.09}O_2$.

As a result of a chemical analysis of the obtained lithium manganese nickel-containing oxide powder (sample), it was confirmed that the sample powder was $Li_{1.14}Mn_{0.34}Ni_{0.30}Co_{0.13}Al_{0.09}O_2$.

Further the primary particle diameter of the obtained lithium manganese nickel-containing oxide powder (sample) was 1.5 μm, and the tap density thereof was 2.1 g/cm³.

<Measurement of the Primary Particle Diameter>

The primary particle diameter was determined as follows. The primary particles were observed by using a SEM (scanning electron microscope HITACHI S-3500N) at an acceleration voltage of 20 kV at a magnification of 5,000 times; and 10 particles were randomly selected from their printed photograph, and minor diameters of the primary particles were measured with a ruler. The measured lengths were converted on the reduced scale, and the average value thereof was determined as the primary particle diameter.

<Measurement of the Tap Density (T.D.)>

There was determined the powder packing density (T.D.) when 50 g of the sample (powder) obtained in the Examples and the Comparative Examples each was put in a 150-ml glass measuring cylinder; and the measuring cylinder was tapped 540 times in a stroke of 60 mm on a shaking specific gravity meter (KRS-409, manufactured by Kuramochi Kagaku Kikai Seisakusho K.K.).

<Measurement of the 50% Cumulative Diameter (D50)>

The particle size distribution of the sample (powder) obtained in the Examples and the Comparative Examples each was measured as follows.

A sample recirculator ("Microtrac ASVR," manufactured by Nikkiso Co., Ltd.) for a laser diffraction particle size distribution analyzer was used; the sample (powder) was charged in an aqueous solution; the mixture was irradiated with a 40-W ultrasonic wave for 360 sec in a flow rate of 40 mL/sec; thereafter, the particle size distribution was measured using the laser diffraction particle size distribution analyzer "HRA (X100)," manufactured by Nikkiso Co., Ltd.; and D50 was determined from a chart of an obtained particle size distribution in terms of volume.

Here, as the aqueous solution in the measurement, water having been passed through a 60-μm filter was used; and with the conditions that: the solvent refractive index is 1.33; the particle transparency condition is reflection; the measurement range is 0.122 to 704.0 μm; and the measuring time is 30 sec, an average value of two-times measurements was used as a measurement value.

<Measurement (BET Method) of the Specific Surface Area (SSA)>

The specific surface areas (SSAs) of the sample (powder) obtained in the Examples and the Comparative Examples each was measured as follows.

First, 0.5 g of the sample (powder) was weighed in a glass cell for a flow-type gas adsorption-measuring specific surface area analyzer MONOSORB LOOP ("MS-18," manufactured by Yuasa Ionics), and was subjected to a heat treatment, after the glass cell interior was replaced by nitrogen gas at a gas volume of 30 mL/min for 5 min by using a pre-treatment apparatus for the MONOSORB LOOP, in the nitrogen gas atmosphere at 250° C. for 10 min. Thereafter, the sample (powder) was measured by one point method for BET by using the MONOSORB LOOP.

Here, as an adsorption gas in the measurement, a mixed gas of 30% of nitrogen and 70% of helium was used.

<Measurement of the Crystallite Size by Rietveld Method>

A powder X-ray diffractometry of the sample (powder) obtained in the Examples and the Comparative Examples each was carried out by using an X-ray diffractometer (D8ADVANCE, manufactured by Bruker AXS K.K.) using a Cu-Kα line. At this time, the analysis was carried out by employing the fundamental parameter. The analysis was carried out on an X-ray diffraction pattern acquired in the range of diffraction angles 2θ of 15 to 120° and by using analysis software Topas Version 3.

The crystal structure was attributed to a trigonal system of a space group R3-m, and refinement to Rwp <5.0 and GOF <1.3 was carried out by assuming that its 3a site was occupied by Li; its 3b site, by Mn, Co, Ni and an excessive Li content x; and its 6c site, by O, and by using, as variables, its oxygen seat occupancy (Occ.) and its isotropic temperature factor (Beq.).

Here, the above Rwp and GOF are values determined by the following expressions (see "Practice of Powder X-Ray Analysis" (in Japanese), edited by Discussion Group of X-Ray Analysis, The Japan Society for Analytical Chemistry, published by Asakura Publishing Co., Ltd., Feb. 10, 2002, Table 6.2 on p. 107).

$$Rwp=[\Sigma_i wi\{yi-fi(x)^2\}/\Sigma_i wiyi^2]^{1/2}$$

$$Re=[(N-P)/\Sigma_i wiyi^2]^{1/2}$$

$$GOF=Rwp/Re$$

Here, wi denotes a statistical weight; yi, an observed intensity; fi(x), a theoretical diffraction intensity; N, a total data number; and P, the number of parameters to be refined.

The refinement procedure involved carrying out the following operations (1) to (3) in order in the state of using the z coordinate and the seat occupancy of oxygen as variables.

(1) Refinement using an isotropic temperature factor of the 3b site alone as a variable (2) Refinement using an isotropic temperature factor of the 6c site alone as a variable (3) Refinement using an isotropic temperature factor of the 3a site alone as a variable The above (1) to (3) procedures were carried out repeatedly until each of the variables came not to vary. Thereafter, the z coordinate and the seat occupancy of oxygen were returned to a fixed value, and refinement was carried out repeatedly, in the state of using the crystallite size (Gauss) and the crystal strain (Gauss) as variables, until the numerical values came not to vary, and the crystallite size (Gauss) was determined.

Additionally, the instrument specification, the instrument condition and the like used in the measurement and the Rietveld method analysis are as follows.

Sample disp (mm): Refine
Detector: PSD
Detector Type: VANTEC-1
High Voltage: 5,616 V
Discr. Lower Level: 0.45 V
Discr. Window Width: 0.15 V
Grid Lower Level: 0.075 V
Grid Window Width: 0.524 V Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.01630098 Th
Det.1 voltage: 760.00 V
Det.1 gain: 80.000000
Det.1 discr.1 LL: 0.690000
Det.1 discr.1 WW: 1.078000
Scan Mode: Continuous Scan
Scan Type: Looked Coupled
Spinner Speed: 15 rpm
Divergence Slit: 0.300°
Start: 15.000000
Time per step: 1 s
Increment: 0.01460
steps: 7,152
Generator voltage: 35 kV
Generator current: 40 mA <Calculation of the XRD Intensity Ratio>

The Kα2 and background elimination was carried out by using an X-ray diffraction pattern acquired as described above and using analysis software EVA Version 11.0.0.3. By using the X-ray diffraction pattern having undergone the elimination, a peak intensity of the main peak in the range of 2θ=20 to 22° and a peak intensity of the main peak in the range of 2θ=16 to 20° were measured, and the "XRD intensity ratio," which is indicated in Table 2, was calculated by the following calculation expression.

Peak intensity ratio of XRD={(a main peak intensity in the range of 2θ=20 to 22°)/(a main peak intensity in the range of 16 to 20°)}×100

<Fabrication Method of Electrodes>

89% by weight of each of the lithium manganese nickel-containing oxide powders (samples) obtained in the Examples and the Comparative Examples, 5% by weight of an acetylene black as a conduction supporting agent, and 6% by weight of a PVDF as a binder were mixed, and made into a paste by adding NMP (N-methylpyrrolidone). The paste was applied on an Al foil current collector of 15 μm in thickness, and dried at 70° C. and 120° C. Thereafter, the resultant was three times pressed at a pressure of 20 MPa to thereby fabricate a positive electrode sheet.

<Evaluation Method of the Electrode Density>

A positive electrode sheet volume was determined by multiplying an area of the positive electrode sheet obtained in the above by a thickness of the positive electrode sheet as measured using a micrometer (MITUTOYO MDC-30). Then, the weight of a positive electrode itself was determined by subtracting a weight of the Al foil from a weight of the positive electrode sheet. The electrode density was determined by dividing the weight of the positive electrode sheet by the positive electrode sheet volume.

Here, in Table 2, the electrode density was indicated as a relative value (index) with the electrode density of Comparative Example 1 being taken to be 100.

<Fabrication Method of Cells for Evaluation>

The positive electrode sheet obtained in the above was cut out into a size of ϕ13 mm to thereby make a positive electrode, which was then dried at 200° C. for 6 hours. On the other hand, lithium metal was cut out into a size of ϕ15 mm to thereby make a negative electrode; and a separator (porous polyethylene film) impregnated with an electrolyte solution in which $LiPF_6$ was dissolved in 1 mol/L in a carbonate-based mixed solution was placed between the positive electrode and the negative electrode to thereby fabricate a 2032-type coin cell (cell for electrochemical evaluation).

(Charge and Discharge Efficiency in One Cycle)

By using the 2032-type coin cell prepared as described above, charge and discharge capacities and a charge and discharge efficiency in one cycle were determined by the following method. That is, a total charge capacity (mAh/g) of an active substance was determined from a capacity when the cell was charged at 25° C. at a constant current value of 0.2 C up to 4.9 V (CC charge), and after the cell reached a voltage of 4.9 V, was charged at the constant voltage value (CV charge) and from a content of the positive electrode active substance in the positive electrode. A pausing time of 10 min was taken, and then, an initial discharge capacity (mAh/g) of the active substance was determined from a capacity when the cell was discharged at a constant current value of 0.2 C down to 2.0 V.

(Calculation Method of the Volumetric Energy Density Index)

The volumetric energy density index ($mAh/cm^3$) was calculated by multiplying the initial discharge capacity (mAh/g) by the electrode density ($g/cm^3$), which were both determined as described above.

Volumetric energy density index=an initial discharge capacity×an electrode density In Table 2, the volumetric energy density is indicated as a relative value (index) with the electrode density of Comparative Example 1 was taken to be 100.

<Evaluation of the Charge Rate Capability>

The charge rate capability index, that is, an index of charge acceptability, was calculated from the charge capacity measured as described above, and was indicated in Table 2.

When the charge rate capability index thus calculated is low, the rate capability in the charge time, that is, the charge acceptability can be evaluated as good. By using this index, it can be presumed that the rate capability of a positive electrode active substance is good.

Charge rate capability index=(a capacity in the CV charging)/(a total charge capacity)×100

TABLE 1

|  | Composition from Analyzed Value | Mn Content in M (wt %) |
|---|---|---|
| Comparative Example 1 | $Li_{1.17}Mn_{0.56}Ni_{0.27}O_2$ | 66 |
| Example 1 | $Li_{1.13}Mn_{0.45}Ni_{0.42}O_2$ | 50 |
| Example 2 | $Li_{1.14}Mn_{0.43}Ni_{0.43}O_2$ | 48 |
| Example 3 | $Li_{1.14}Mn_{0.43}Ni_{0.30}Co_{0.13}O_2$ | 48 |
| Example 4 | $Li_{1.14}Mn_{0.34}Ni_{0.30}Co_{0.13}Al_{0.09}O_2$ | 40 |

TABLE 2

| | Primary Particle Diameter of Lithium Composite Metal Oxide (μm) | Primary Particle Diameter of Over-Lithiated Layered Lithium Metal Composite Oxide (μm) | D50 (μm) | T.D. (g/cc) | SSA (m²/g) | Crystallite Size (nm) | XRD Intensity Ratio (%) | Electrode Density Index (the case where Comparative Example 1 was taken as 100) | Initial Discharge Capacity (mAh/g) | Volumetric Energy Density Index (the case where Comparative Example 1 was taken as 100) | Charge Rate Capability Index (%) |
|---|---|---|---|---|---|---|---|---|---|---|---|
| Comparative Example 1 | — | 0.6 | 17 | 1.4 | 1.0 | 82.1 | 4.7 | 100 | 207 | 100 | 16 |
| Example 1 | 0.9 | 1.2 | 10 | 2.2 | 1.4 | 67.2 | 1.1 | 110 | 239 | 127 | 3 |
| Example 2 | 0.9 | 1.6 | 11 | 2.5 | 0.7 | 90.7 | 1.2 | 126 | 177 | 107 | 9 |
| Example 3 | 0.8 | 1.5 | 13 | 2.2 | 0.6 | 91.0 | 1.3 | 123 | 191 | 113 | 5 |
| Example 4 | 1.1 | 1.5 | 6 | 2.1 | 0.7 | 148.2 | 0.5 | 137 | 154 | 102 | 10 |

(Consideration)

As in the above Examples, when an over-lithiated layered lithium metal composite oxide was fabricated by firstly making the primary particle diameter to largely grow in the range of x in $Li_{1+x}M_{1-x}O_2$ of −0.15 to 0.15, and then adding a lithium compound and calcining the resultant, the primary particle diameter of the over-lithiated layered lithium metal composite oxide (OLO) could be made sufficiently large; the tap density thereof could be raised; and the volumetric energy density as an electrode could be enhanced. And moreover because of exhibiting charge acceptability equal to or higher than that of the samples thereof in spite of being improved in the electrode density, had a good rate capability, especially a good charge rate capability.

Figure 6:
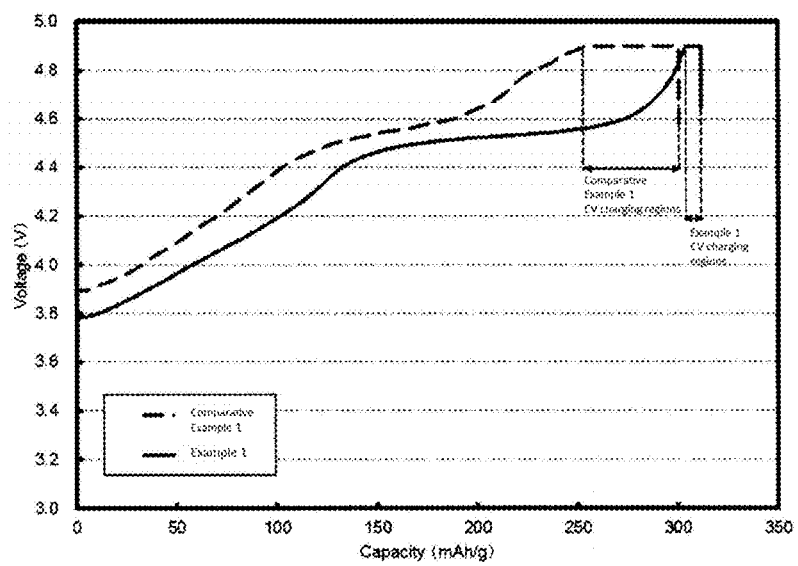
FIG. 6 is a graph showing a charge rate capability index of the cells using the lithium manganese nickel-containing oxide powders (samples) obtained in Example 1 and Comparative Example 1.

Further as seen in FIG. 6, it was found that Examples 1 to 4 were better in charge acceptability and better in the rate capability than the Comparative Examples, also from differences between lengths of their CV charging regions.

Further in the diffraction pattern of the crystal structure XRD (X-ray diffraction), when peaks are present in the range of 2θ=20 to 22°, it is presumed that since the crystal structure changes in the charge time, the charge and discharge efficiency in one cycle decreases. Then, it can be considered that in the finally obtained over-lithiated layered lithium metal composite oxide, it is preferable that no peaks are present in the range of 2θ=20 to 22°, and it is preferable that the intensity of the main peak in the range of 2θ=20 to 22° is lower than 4.0% relative to the intensity of the main peak in the range of 2θ=16 to 20°.

Here, although Example 4 comprised a composition containing Co, Al alone as M in the general formula $Li_{1+x}M_{1-x}O_2$, Co, Al has properties common with Ni, Mg, Ti, Fe and Nb in the points of the ionic radius and the chemical stability. Thus, it can also be considered in the case where M contains at least one or more elements selected from the group consisting of Mg, Ti, Fe and Nb that the case can have an effect similar to that of the sample obtained in Example 4.

The invention claimed is:

1. A method for producing an over-lithiated layered lithium metal composite oxide represented by the general formula $Li_{1+x}M_{1-x}O_2$, where x is 0.10 or more and 0.33 or less, and M comprises Mn and at least one element selected from the group consisting of Ni, Co, Al, Mg, Ti, Fe and Nb, the method comprising a step of mixing a lithium metal composite oxide represented by the general formula $Li_{1+x}M_{1-x}O_2$, where x is −0.15 or more and 0.15 or less, and M comprises Mn and at least one element selected from the group consisting of Ni, Co, Al, Mg, Ti, Fe and Nb, with a lithium compound to obtain a mixture and calcining the mixture to thereby obtain the over-lithiated layered lithium metal composite oxide.

2. The method for producing an over-lithiated layered lithium metal composite oxide according to claim 1, the method further comprising:
 a first step of calcining a raw material composition containing raw materials of a "Li element" and "M elements" in the general formula $Li_{1+x}M_{1-x}O_2$, where x is −0.15 or more and 0.15 or less, and M comprises Mn and at least one element selected from the group consisting of Ni, Co, Al, Mg, Ti, Fe and Nb, to thereby obtain a lithium metal composite oxide represented by the general formula $Li_{1+x}M_{1-x}O_2$, where x is −0.15 or more and 0.15 or less, and M always Mn and at least one element selected from the group consisting of Ni, Co, Al, Mg, Ti, Fe and Nb; and
 a second step of mixing and calcining the lithium metal composite oxide obtained in the first step with a lithium compound to thereby obtain the over-lithiated layered lithium metal composite oxide.

3. The method for producing an over-lithiated layered lithium metal composite oxide according to claim 1, wherein the lithium metal composite oxide has a primary particle diameter of 0.7 μm or larger.

4. The method for producing an over-lithiated layered lithium metal composite oxide, according to claim 2, wherein in the first step, the calcination is carried out once or twice or more.

5. The method for producing an over-lithiated layered lithium metal composite oxide according to claim 2, wherein a calcining temperature in the second step is higher than a calcining temperature in the first step.

6. The method for producing an over-lithiated layered lithium metal composite oxide according to claim 2, wherein the first step or the second step or both the steps are carried out once or twice or more.

7. The method for producing an over-lithiated layered lithium metal composite oxide according to claim 1, wherein the lithium compound to be used is lithium hydroxide or lithium carbonate.

* * * * *